(12) United States Patent
Kolp et al.

(10) Patent No.: US 7,750,089 B2
(45) Date of Patent: Jul. 6, 2010

(54) DISPERSANT VISCOSITY MODIFIERS BASED ON DIENE-CONTAINING POLYMERS

(75) Inventors: Christopher Kolp, Richmond Heights, OH (US); Matthew D. Gieselman, Willoughby Hills, OH (US); Renee A. Eveland, Concord Township, Lake County, OH (US); Philip Pike, Concord Township, Lake County, OH (US); John K. Pudelski, Cleveland Heights, OH (US); Michael J. Covitch, Cleveland Heights, OH (US); Christopher Friend, Bobbersmill (GB)

(73) Assignee: The Lubrizol Corporation, Wickliffe, OH (US)

( * ) Notice: Subject to any disclaimer, the term of this patent is extended or adjusted under 35 U.S.C. 154(b) by 720 days.

(21) Appl. No.: 10/598,656

(22) PCT Filed: Mar. 8, 2005

(86) PCT No.: PCT/US2005/007544

§ 371 (c)(1), (2), (4) Date: May 16, 2007

(87) PCT Pub. No.: WO2005/087821

PCT Pub. Date: Sep. 22, 2005

(65) Prior Publication Data

US 2007/0293409 A1    Dec. 20, 2007

Related U.S. Application Data

(60) Provisional application No. 60/551,838, filed on Mar. 10, 2004, provisional application No. 60/569,557, filed on May 10, 2004.

(51) Int. Cl.
C08C 19/22 (2006.01)

(52) U.S. Cl. ........................ 525/374; 525/379; 525/382; 525/386

(58) Field of Classification Search .................. 525/374, 525/379, 382, 386
See application file for complete search history.

(56) References Cited

U.S. PATENT DOCUMENTS

| | | | |
|---|---|---|---|
| 4,863,623 A | 9/1989 | Nalesnik et al. | |
| 4,904,401 A | 2/1990 | Ripple et al. | |
| 5,264,140 A | 11/1993 | Mishra et al. | |
| 5,409,623 A * | 4/1995 | Mishra et al. | ............... 508/184 |
| 5,429,757 A | 7/1995 | Mishra et al. | |
| 5,563,118 A | 10/1996 | Mishra et al. | |
| 5,620,486 A | 4/1997 | Cherpeck | |
| 6,025,308 A | 2/2000 | Matsuya et al. | |
| 6,107,257 A | 8/2000 | Valcho et al. | |
| 6,107,258 A | 8/2000 | Esche et al. | |
| 6,117,825 A | 9/2000 | Liu et al. | |
| 6,187,721 B1 | 2/2001 | Goldblatt et al. | |
| 6,207,624 B1 | 3/2001 | Supp et al. | |
| 6,284,716 B1 | 9/2001 | Gunther et al. | |
| 6,544,935 B1 | 4/2003 | Vargo et al. | |
| 2004/0043909 A1 | 3/2004 | Goldblatt et al. | |
| 2005/0153849 A1 | 7/2005 | Mishra et al. | |
| 2006/0025316 A1 | 2/2006 | Covitch et al. | |

FOREIGN PATENT DOCUMENTS

| | | |
|---|---|---|
| EP | 0396297 | 11/1990 |
| GB | 2033907 | 5/1980 |
| WO | 0198387 | 12/2001 |
| WO | WO 01/98387 A2 * | 12/2001 |
| WO | 2005103093 | 11/2005 |

* cited by examiner

*Primary Examiner*—Ling-Siu Choi
(74) *Attorney, Agent, or Firm*—David M. Shold; Christopher D. Hilker

(57) ABSTRACT

A composition of the reaction product of (a) an isobutylene-diene copolymer having thereon groups containing carboxylic acid functionality or reactive equivalent thereof, derived from an α,β-unsaturated carboxylic compound; and (b) an amine component comprising at least one aromatic amine containing at least one N—H group capable of condensing with said carboxylic acid functionality, is a useful dispersant viscosity modifier.

23 Claims, No Drawings

DISPERSANT VISCOSITY MODIFIERS BASED ON DIENE-CONTAINING POLYMERS

BACKGROUND OF THE INVENTION

The present invention relates to dispersants for use in fuels and in engine oil lubricants, especially for reducing soot-induced viscosity increase in heavy duty diesel engines.

Heavy duty diesel vehicles may use exhaust gas recirculation (EGR) engines in efforts to reduce environmental emissions. Among the consequences of recirculating the exhaust gas through the engine are different soot structures and increased viscosity of the oil at lower soot levels, compared with engines without EGR. It is desirable that oil exhibit minimal viscosity increase, e.g., less than 12 mm$^2$/sec (cSt) at a soot loading of 6%. A material that attenuates viscosity increase typically disperses soot up to high soot loading.

It is also desirable that a lubricating oil composition maintain a relatively stable viscosity over a wide range of temperatures. Viscosity improvers are often used to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Traditional dispersant viscosity modifiers (DVMs) made from ethylene-propylene copolymers that have been radically grafted with maleic anhydride and reacted with various amines have shown desirable dispersant performance. Aromatic amines are said to show good performance in this regard. DVMs of this type are disclosed in U.S. Pat. No. 4,863,623, Nalesnik et al., Sep. 5, 1989, as well as U.S. Pat. Nos. 6,107,257, Valcho et al., and 6,107,258, Esche et al., each Aug. 22, 2000, and U.S. Pat. No. 6,117,825, Liu et al., Sep. 12, 2000.

Other polymer backbones have also been used for preparing dispersants. For example, polymers derived from isobutylene and isoprene ("IOB/IP") have been used in preparing dispersants and are reported in WO 01/98387. The present invention provides a dispersant viscosity modifier based on a polymer of isobutylene and a diene such as isoprene which is, however, distinguished from such earlier dispersants by means of, among other things, the molecular weight of the polymer backbone and, generally, the selection of the significantly different amine component, leading to a significantly different polymeric structure. The present materials exhibit superior performance in engine tests. Moreover, the synthesis of the present materials, based upon isobutylene and a diene typically is significantly simpler and less costly than the synthesis of ethylene/propylene copolymers. Typically only a single catalyst is required, and extremely flammable hydrogen gas is not required as a chain terminator. The polymers in question have the advantage of providing olefin unsaturation and thus being suitable for further functionalization with or without a catalyst or solvent.

The present invention, therefore, solves the problem of providing a low cost dispersant viscosity modifier having improved performance in engine tests, providing a good viscosity index and good soot dispersion and toleration properties, particularly in diesel engine, and especially in heavy duty diesel engines employing exhaust gas recirculation.

SUMMARY OF THE INVENTION

Therefore, the present invention provides a composition comprising the reaction product of:

(a) an isobutylene-diene copolymer having an $\overline{M_n}$ of 1000 to 150,000 and containing thereon an average of 0.1 to 4 equivalents, per each 1000 units of $\overline{M_n}$ of the polymer, of carboxylic acid functionality or reactive equivalent thereof, derived from at least one α,β-unsaturated carboxylic compound; and (b) an amine component comprising at least one aromatic amine containing at least one N—H group capable of condensing with said carboxylic acid functionality.

The invention also provides lubricants and lubricant concentrates comprising the foregoing reaction product and an oil of lubricating viscosity, as well as a method for lubricating an internal combustion engine by supplying the same thereto.

The invention also provides A process for preparing a carboxylic derivative composition, comprising:

(a) reacting (i) an isobutylene-diene copolymer having an $\overline{M_n}$ of 1000 to 150,000 and having on average 0.1 to 2 units of reactive carbon-carbon double bonds per each 1000 units of $\overline{M_n}$ of the polymer, with (ii) an α,β-unsaturated carboxylic compound having carboxylic acid functionality or reactive equivalent thereof; and (b) reacting the product of (a) with an amine component comprising at least one aromatic amine containing at least one N—H group capable of condensing with said carboxylic acid functionality.

The invention also provides a process for improving the viscosity index of a lubricating oil composition, comprising incorporating into said composition a minor, viscosity-improving amount, of the composition as described herein.

DETAILED DESCRIPTION OF THE INVENTION

Various preferred features and embodiments will be described below by way of non-limiting illustration.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The Copolymer

The compositions of the present invention are derived from isobutylene-diene copolymers having $\overline{M_n}$ of 1000 to 150,000, alternatively 1000 to 100,000, or 1000 to 50,000, or 1000 to 25,000, or 2000 to 18,000, or 3000 to 16,000. A mole of copolymer is defined herein as the $\overline{M_n}$ or number average molecular weight of the copolymer, expressed in grams. Molecular weights of the copolymers are determined using well known methods described in the literature. Examples of procedures for determining molecular weights are gel permeation chromatography (GPC), light scattering, and vapor phase osmometry (VPO). The GPC technique is calibrated using well-characterized polymers against which the samples are compared. For best results, standards that are chemically similar to those of the sample are used. For example, for polystyrene polymers, a polystyrene standard, preferably of similar molecular weight, is employed. When standards are chemically dissimilar to the sample, generally relative molecular weights of related polymers can be determined. For example, using a polystyrene standard, relative, but not absolute, molecular weights of a series of polyalkylmethacrylates may be determined. For the present materials, polyisobutylene standards are preferably used.

Copolymers of this invention can be prepared employing cationic polymerization catalysts. Lewis acids are particularly preferred catalysts. These include metal halides, for example $AlCl_3$, $BF_3$, $SnCl_4$, $SbCl_5$, $ZnCl_2$, $TiCl_4$, and $PCl_5$, organometallic derivatives, for example $RAlCl_2$, $R_2AlCl$, $R_3Al$, where R is a hydrocarbon group, and oxyhalides, for example $POCl_3$, $CrO_2Cl$, $SOCl_2$, and $VOCl_3$. Suitable catalysts include aluminum compounds such as $AlCl_3$, $AlEtCl_2$ and $AlEt_2Cl$, where Et is ethyl. Initiation by Lewis acids requires or tends to proceed faster in the presence of a proton donor such as water, hydrogen halide, alcohol and carboxylic acid or a carbocation donor such as t-butyl chloride or triphenylmethyl fluoride. Alternatively, copolymers of the desired molecular weight can be prepared from corresponding butyl rubber compounds of higher molecular weight, by shearing them an appropriate high shear device such as an extruder. Butyl rubbers and their preparation are well known and are disclosed, e.g., in Kresge et al., "Isobutyl Polymers," *Ency. Polym. Sci. Eng.* (1987) 8, 423-48.

Copolymers are defined herein as polymers derived from at least two different monomers. Thus, copolymers include polymers derived from, for example, 2, 3, 4 or more different monomers, more often 2 or 3 different monomers. Accordingly, copolymers of the instant invention are derived from isobutylene and at least one diene which may have conjugated or isolated (non-conjugated) double bonds. More often the polyenes are conjugated dienes. Suitable dienes include isoprene, piperylene (1,3-pentadiene), 1,3-butadiene, and limonene (dipentene, or p-mentha-1,8-diene, optically active or inactive). Terpolymers derived from isobutylene, isoprene and 1,3-butadiene are useful. Other dienes that can be present include, methylisoprene, dicyclopentadiene, 1,4-pentadiene, 2,3-dimethyl-1,3-butadiene, trans-2-methyl-1,3-pentadiene, cyclopentadiene, 1,5-hexadiene, 2,4-hexadiene, 2,5-dimethyl-2,4-hexadiene, 1,5-heptadiene, 1,7-octadiene, and 5-ethylidene-2-norbornene. Triene can also be present, such as 1,3,5-cycloheptatriene, 2,6-dimethyl-2,4,6-octatriene, myrcene, 1-iso-propylidene-3a,4,7,7a-tetrahydroindene, 1-isopropylidene- and 2-(2-methylene-4-methyl-3-pentenyl)[2.2.1]bicyclo-5-heptene and higher polyenes such as cyclooctatetraene. Both cis and trans isomers can be used.

The copolymer typically contains 0.1 to 4 or 0.1 to 2 units derived from diene per 1000 $\overline{M_n}$ of the polymer, or alternatively 0.15 to 1.0 units per $1000\overline{M_n}$. This means that, for instance, a polymer of 2000 $\overline{M_n}$ could contain 0.2 to 4 diene-derived units, a polymer of 25,000 could contain 2.5 to 50 units, on average, and so on. Of course, polymers should normally contain on average at least 1 diene unit per polymer chain, since it would not normally be desirable to have a significant fraction of the polymer chains without the additional reactive site provided by the diene monomer. As otherwise expressed, the copolymer can comprise, for instance, an average of 1 to 150, or 1 to 100, or 1 to 50, or 1 to 30, or 1 to 25, or 1 to 12, or 1 to 10 moles, frequently 1.5 or 2 to 8 moles, of units derived from diene, per mole based on $\overline{M_n}$ of copolymer, the actual amount, of course, depending to some extent on the $\overline{M_n}$ of the copolymer. The copolymer (prior to reaction with the unsaturated carboxylic compound) typically contains a corresponding number of reactive carbon to carbon double bonds per mole thereof. The term "reactive" in this context means that the double bond is capable of reacting with and adding to the carbon-carbon double bond of the unsaturated carboxylic compounds under conditions as described below. It is observed that under certain conditions, especially for the thermal or "ene" reaction, not all the double bonds in the copolymer are reactive; perhaps 70-97% or 80-95% of the double bonds will be reactive. While not wishing to be bound by theory, it is believed that, in order to assure suitable reactivity with unsaturated carboxylic compounds such as maleic anhydride under such conditions, it may be desirable that the diene such as isoprene be predominantly incorporated in a 1,4 addition. The amount of 1,4 versus 1,2 incorporation can be determined by $^1H$ NMR.

The isobutylene-polyene copolymers of this invention permit greater flexibility in the design of the polymer and ultimately, derivatives thereof. The use of more than one monomer permits the design of a polymer having particularly desired properties.

Polymerizations can be conducted at temperatures of −90 or −78° C. to 50° C.; more commonly −50° C. to −15° C. or to 0° C. Generally lower temperatures lead to higher molecular weight polymer. Reaction pressures range from about atmospheric to 345 kPa gauge (50 pounds per square inch, gauge [psig]), preferably 55 to 117 kPa gauge (8 to about 17 psig). The reactivity of the diene towards copolymerization with isobutylene determines the amount charged relative to isobutylene. When the reactivity of the diene is similar to the reactivity of isobutylene, the mole ratio of polyene charged is similar to that incorporated into the polymer; if it is less reactive, the amount incorporated may be less. For example, in the case of isoprene, a relative mole ratio of 9% leads to about 2.3% isoprene incorporated into the copolymer as determined by $^1H$ NMR. For dienes having reactivities much less than that of isobutylene, the mole ratio of polyene charged is considerably greater than the amount of polyene incorporated into the polymer, often 20 times greater, and sometimes even more. Dry solvents are frequently used during the polymerizations. Solvents can solubilize the polymer and provide a means for controlling the reaction temperature. Reaction times usually depend on the scale of the reaction and the amount of cooling that can be delivered to the reactor. The reaction can be quenched with methanol, water or dilute caustic solution, and washed with water. Then solvents and light ends, including lower-boiling by-products are removed by stripping, usually at elevated temperature and reduced pressure.

α,β-Unsaturated Carboxylic Compound

The carboxylic derivative compositions of this invention are prepared from carboxylated isobutylene-diene, copolymers. Carboxylation is effected by reacting the copolymer with at least one α,β-unsaturated carboxylic compound or reactive equivalent thereof. The carboxylated copolymer typically contains 0.1 to 4 or 0.1 to 2 equivalents of unsaturated carboxylic acid functionality per each 1000 units of $\overline{M}_n$ of the polymer, or 0.15 to 1 unit per each 1000 units of $\overline{M}_n$, as described above for the number of diene units in the polymer. Thus, just as described above, there can be, in certain embodiments, 1 to 50 or 1 to 30 or 1 to 25 or 1 to 12, or 1.5 to 10 moles, per mole of copolymer, of groups containing carboxylic acid functionality or reactive equivalent thereof, said groups derived from at least one (α,β-unsaturated carboxylic compound.

A reactive equivalent of an α,β-unsaturated carboxylic compound is a reactant that will react in a fashion similar to a carboxylic acid to form derivatives that are essentially the same as those obtained from the carboxylic acid. For example, anhydrides, lower alkyl esters, and acyl halides will react with amines to form substantially similar products as will the corresponding acids. Anhydrides, lower alkyl esters and acyl halides are all considered to be reactive equivalents to the corresponding acid.

The α,β-ethylenically unsaturated carboxylic acids and reactive equivalents thereof are well known in the art. The most commonly used materials contain two to 20 carbon atoms exclusive of carbonyl carbons. These include such acids as acrylic acid, methacrylic acid, maleic acid, fumaric acid, crotonic acid, citraconic acid, itaconic acid and mesaconic acid, as well as their anhydrides, halides and esters (especially the lower alkyl esters, the term "lower alkyl" meaning alkyl groups having up to 7 carbon atoms). Preferred are acrylic compounds, maleic compounds, fumaric compounds and itaconic compounds, in which context the term "compounds" is intended to refer to the acids and reactive equivalents thereof as described herein. Especially preferred compounds are the α,β-olefinically unsaturated carboxylic acids, especially those containing at least two carboxy groups and more preferably dicarboxylic acids, and their derivatives. Maleic acid and maleic anhydride, especially the latter, are particularly suitable. Maleic compounds and other materials bearing two vicinal carboxy groups are to be counted as contributing two equivalents of carboxylic acid functionality.

In order to minimize the amount of chlorine present in the carboxylic derivatives of this invention, it is sometimes desirable to avoid the use of chlorine or chlorine containing reactants, promoters, or catalysts. Accordingly, in one embodiment, the carboxylated copolymer is prepared by a thermal reaction wherein the copolymer and the alpha-beta-olefinic carboxylic acids or reactive equivalents thereof are reacted by simply combining and heating the reactants at an elevated temperature, usually from 150° C. to 250, or to 240, or to 230° C., preferably from about 180° C. The thermal reaction can be conducted without addition of any catalyst or initiator, avoiding the possible need for its subsequent removal. The time for the reaction can be 4-6 hours, or up to 24 hours, or as otherwise will be apparent to the person skilled in the art. The reaction can be conducted in a stirred vessel or in an extruder under known conditions.

Preparation of products of the present invention via the so-called "thermal" route may be seen as analogous in terms of processing steps to the known preparation of conventional dispersant by a thermal process. As disclosed in the literature, it is known that relatively high vinylidene polyisobutylene can be prepared, typically by use of a $BF_3$ catalyst, and subsequently reacted with maleic anhydride. The reaction occurs in the absence of chlorine catalyst by a series of thermal "ene" reactions to produce a mixture of mono- and poly-succinated dispersant material. Preparation of conventional acylating agents from polyisobutylene made from a $BF_3$ process and their reaction with amines is disclosed in U.S. Pat. No. 4,152,499. Similar adducts are known, based on polymers other than polyisobutylene. For instance U.S. Pat. No. 5,275,747 discloses derivatized ethylene alpha-olefin polymers with terminal ethenylidene unsaturation which can be substituted with mono- or dicarboxylic acid producing moieties.

In an alternative process, the present grafted copolymers can be prepared by a radical reaction, that is, by radically grafting the unsaturated carboxylic compound onto a chain of the isobutylene-diene polymer in a stirred vessel in the presence or absence of solvent or in an extruder, typically in the presence of an additional free radical initiator to provide a randomly grafted product. Suitable free radical initiators are well known materials, including peroxy-containing materials. The polymer may also be subjected to high shear as a result of the extrusion process, leading to polymer chains of reduced molecular weight. Such a grafting process is disclosed, for instance, in U.S. Pat. No. 3,862,265.

The amount of carboxylic compound reacted with the polymer is in certain instances less than or equal to, on an equivalent basis, the amount of reactive double bonds within the polymer. It may be desirable to avoid the presence of excess acid material, which may need to be subsequently removed, although an excess may be supplied if a more complete conversion is desired. Also, when a radical grafting process is employed, amounts of carboxylic compound may be employed in excess of the amount of initially present reactive double bonds, e.g., up to 1.1, or 1.2 or 1.5 equivalents.

Aromatic Amine

The carboxylic derivative compositions of this invention are obtained by reacting the carboxylated copolymer with an aromatic amine containing at least one, and preferably exactly one, N—H group capable of condensing with said carboxylic acid functionality, to form nitrogen-containing carboxylic derivatives of the present invention which contain dispersant functionality. Aromatic amines include those which can be represented by the general structure $NH_2$—Ar, where Ar is an aromatic group, including nitrogen-containing aromatic groups and Ar groups including any of the following structures

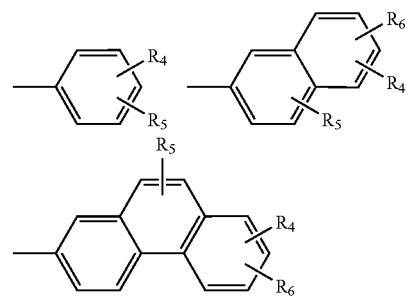

as well as multiple non-condensed aromatic rings. In these and related structures, $R_4$, $R_5$, and $R_6$ can be independently, among other groups disclosed herein, —H, —$C_{1-18}$ alkyl groups, —NH—Ar, —N=N—Ar, —NH—CO—Ar, —OOC—Ar, —OOC—$C_{1-18}$ alkyl, —COO—$C_{1-18}$ alkyl, —OH, —O—$(CH_2CH_2$—$O)_nC_{1-18}$ alkyl groups, —$NO_2$, and —O—$(CH_2CH_2O)$Ar (where n is 0 to 10).

Aromatic amines include but are not limited to those amines wherein a carbon atom of the aromatic ring structure is attached directly to the amino nitrogen. The amines may be monoamines or polyamines. The aromatic ring will typically be a mononuclear aromatic ring (i.e., one derived from benzene) but can include fused aromatic rings, especially those derived from naphthalene. Examples of aromatic amines include aniline, N-alkylanilines such as N-methyl aniline, and N-butylaniline, di-(para-methylphenyl)amine, naphthylamine, 4-aminodiphenylamine, N,N-dimethylphenylenediamine, 4-(4-nitrophenylazo)aniline (disperse orange 3), sulfamethazine, 4-phenoxyaniline, 3-nitroaniline, 4-aminoacetanilide 4-amino-2-hydroxy-benzoic acid phenyl ester (phenyl amino salicylate), N-(4-amino-5-methoxy-2-methyl-phenyl)-benzamide (fast violet B), N-(4-amino-2,5-dimethoxy-phenyl)-benzamide (fast blue RR), N-(4-amino-2,5-diethoxy-phenyl)-benzamide (fast blue BB), N-(4-amino-phenyl)-benzamide and 4-phenylazoaniline. Other examples include para-ethoxyaniline, para-dodecylaniline, cyclohexyl-substituted naphthylamine, and thienyl-substituted aniline. Examples of other suitable aromatic amines include amino-substituted aromatic compounds and amines in which the amine nitrogen is a part of an aromatic ring, such as 3-aminoquinoline, 5-aminoquinoline, and 8-aminoquinoline. Also included are aromatic amines such as 2-aminobenzimidazole, which contains one secondary amino group attached directly to the aromatic ring and a primary amino group attached to the imidazole ring. Other amines include N-(4-anilinophenyl)-3-aminobutanamide (i.e., φ-NH-φ-NH—COCH$_2$CH(CH$_3$)NH$_2$). Additional aromatic amines and related compounds are disclosed in U.S. Pat. Nos. 4,863,623, 6,107,257, and 6,107,258; some of these include aminocarbazoles, aminoindoles, aminopyrroles, aminoindazolinones, aminoperimidines, mercaptotriazoles, aminophenothiazines, aminopyridiens, aminopyrazines, aminopyrimidines, pyridines, pyrazines, pyrimidines, aminothiadiazoles, aminothiothiadiazoles, and aminobenzotriaozles. Other suitable amines include 3-amino-N-(4-anilinophenyl)-N-isopropyl butanamide, and N-(4-anilinophenyl)-3-{(3-aminopropyl)-(cocoalkyl) amino}butanamide. Other aromatic amines which can be used include various aromatic amine dye intermediates containing multiple aromatic rings linked by, for example, amide structures. Examples include materials of the general structure

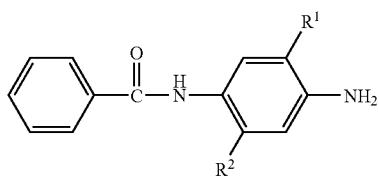

and isomeric variations thereof, where $R^1$ and $R^2$ are independently hydrogen, alkyl groups, or alkoxy groups such as methyl, methoxy, or ethoxy. In one instance, $R^1$ and $R^2$ are both —OCH$_3$ and the material is known as Fast Blue RR [CAS#6268-05-9]. In another instance, $R^1$ is —OCH$_3$ and $R^2$ is —CH$_3$, and the material is known as Fast Violet B [99-21-8]. When both $R^1$ and $R^2$ are ethoxy, the material is Fast Blue BB [120-00-3]. U.S. Pat. No. 5,744,429 discloses other aromatic amine compounds, particularly aminoalkylphenothiazines. N-aromatic substituted acid amide compounds, such as those disclosed in U.S. Patent application 2003/0030033 A1, may also be used for the purposes of this invention. Preferred aromatic amines include those in which the amine nitrogen is a substituent on an aromatic carboxylic compound, that is, the nitrogen is not sp$^2$ hybridized within an aromatic ring. The aromatic amine will preferably have an N—H group capable of condensing with a carboxylic acid acylating agent.

Certain aromatic amines are commonly used as antioxidants. Of particular importance in that regard are alkylated diphenylamines such as nonyldiphenylamine and dinonyldiphenylamine. To the extent that these materials will condense with the carboxylic functionality of the polymer chain, they are also suitable for use within the present invention. However, it is believed that the two aromatic groups attached to the amine nitrogen may lead to steric hindrance and reduced reactivity. Thus, preferred amines are those having a primary nitrogen atom (—NH$_2$) or a secondary nitrogen atom in which one of the hydrocarbyl substituents is a relatively short chain alkyl group, e.g., methyl. Among preferred aromatic amines are 4-phenylazoaniline, 4-aminodiphenylamine, 2-aminobenzimidazole, 3-nitroaniline, 4-(4-nitrophenylazo)aniline (disperse orange 3), N-(4-amino-5-methoxy-2-methyl-phenyl)-benzamide (fast violet B), N-(4-amino-2,5-dimethoxy-phenyl)-benzamide (fast blue RR), N-(4-amino-2,5-diethoxy-phenyl)-benzamide (fast blue BB), N-(4-amino-phenyl)-benzamide, and N,N-dimethylphenylenediamine.

The above-described aromatic amines can be used alone or in combination with each other. They can also be used in combination with additional, aromatic or non-aromatic, e.g., aliphatic, amines, which, in one embodiment, comprise 1 to 8 carbon atoms. These additional amines can be included for a variety of reasons. Sometimes it may be desirable to incorporate an aliphatic amine in order to assure complete reaction of the acid functionality of the polymer, in the event that some residual acid functionality may tend to react incompletely with a relatively more bulky aromatic amine. Alternatively, an aliphatic amine may replace a portion of a more costly aromatic amine, while maintaining the majority of the performance of the aromatic amine. Aliphatic monoamines include methylamine, ethylamine, propylamine and various higher amines. Diamines or polyamines can be used for this function, provided that, in general, they have only a single reactive amino group, that is, a primary or secondary, and preferably primary, group. Suitable examples of such diamines include dimethylaminopropylamine, diethylaminopropylamine, dibutylaminopropylamine, dimethylaminoethylamine, diethylaminoethylamine, dibutylaminoethylamine, 1-(2-aminoethyl)piperidine, 1-(2-aminoethyl)pyrrolidone, aminoethylmorpholine, and aminopropylmorpholine. The amount of such an amine is typically a minor amount compared with the amount of the aromatic amine, that is, less than 50% of the total amine present on a weight or molar basis, although higher amounts can be used. Exemplary amounts include 10 to 70 weight percent, or 15 to 50 weight percent, or 20 to 40 weight percent.

In one embodiment of the invention, the amine component of the reaction product further comprises an amine having at least two N—H groups capable of condensing with said carboxylic acid functionality (that is, two or more reactive groups). This material is referred to hereinafter as a "linking amine" as it can be employed to link together two of the polymers containing the carboxylic acid functionality. Such products exhibit even more superior soot-handling performance. The linking amine can be either an aliphatic amine or an aromatic amine; if it is an aromatic amine, it is considered to be in addition to and a distinct element from the aromatic amine described above, which need have and preferably should have only one condensable or reactive NH group, in order to avoid excessive crosslinking of the polymer chains. Examples of such linking amines include ethylene diamine, 2,4-diaminotoluene and phenylene diamine; others include propylene diamine, hexamethylene diamine, and other α,β-polyalkylenediamines.

Other specific means of linkage of an aromatic amine onto the carboxy-containing interpolymer are also contemplated as included within the scope of the invention by the expression "the reaction product of an isobutylene-diene copolymer and an amine component." For example, amine functionality can be introduced into the polymer by including an amine-containing comonomer in the reaction mixture when the interpolymer is grafted. The amine-containing comonomer can be the reaction or condensation product of an amine with the alpha, beta-unsaturated acylating agent described above. For instance, the condensation product of maleic anhydride and an aromatic amine such as 4-aminodiphenylamine or 4-phenylazoaniline can be employed. The latter materials is known and bears the CAS number [16201-96-0]. It is believed to have the structure

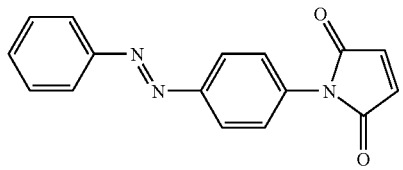

4-phenylazomaleinanil
or 1-(4-pheylazo-phenyl)-pyrrole-2,5-dione (including geometric and positional isomers thereof). Similarly, the adduct with 4-aminodiphenylamine and methods of its preparation are reported in U.S. Patent Application Publication 2004/0043909; see for instance Example 1 on page 15.

In another example of such an alternative route, a hydroxyamide can be esterified with the carboxy groups on the polymer chain. Exemplary hydroxyamides can be represented by

and

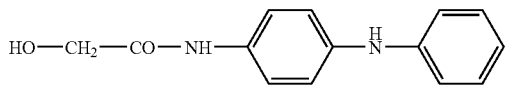

where the Ar is an aromatic moiety of the aromatic amine (which may contain additional nitrogen or other functionality) and R is an alkylene or hydrocarbylene linking group. Alternatively, a hydroxyacid can be first esterified with a carboxy group on the interpolymer and thereafter reacted with an aromatic amine; in either case the hydroxyacid serves as a linking group between the polymer chain and the aromatic amine.

The total amount of the amine condensed onto the carboxylic acid functionality of the polymer is preferably about 1 equivalent of reactive amine functionality per equivalent of α,β-unsaturated carboxy compound on the polymer chain as described above. If more than a stoichiometric amount is used, excess amine may remain and may need to be removed from the product. If less than a stoichiometric amount is used, residual unreacted acid or anhydride functionality may remain in the polymer which may likewise be undesirable. If a diamine is used in addition to an aromatic monoamine, the diamine can be present in an amount of 1 mole (that is, 2 equivalents) of condensable amine functionality per 5 to 6 moles of carboxy compound on the polymer chain. Thus, the diamine can be 1 mole (2 equivalents) per 4 to 5 moles of aromatic monoamine. It is desirable that any linking amine be used in an amount such that the anhydrides (or carboxy materials) on any given polymer chain react with an amine nitrogen from only one linking amine molecule, so as to minimize the likelihood of gelling of the polymer.

The carboxylic derivative compositions produced by reacting the carboxylated copolymers of the invention and the amines described above are acylated amines which include amine salts, amides, imides and imidazolines as well as mixtures thereof. To prepare the carboxylic derivative compositions from the amines, one or more of the carboxylated copolymers and one or more amines can be heated, optionally in the presence of a normally liquid, substantially inert organic liquid solvent/diluent, at temperatures of 80° C. up to the decomposition point of any of the reactants or the product, but normally at temperatures of 100° C. to 300° C., provided 300° C. does not exceed the decomposition point of a reactant or the product. Temperatures of 125° C. to 250° C. are commonly used. If more than one amine is used, the amines can be added and reacted in either order, or simultaneously. The carboxylic composition and the amine are reacted in an amount sufficient to provide from about one-half equivalent up to two moles of amine per equivalent of the carboxylic composition. In another embodiment, the carboxylic composition is reacted with from about one-half equivalent up to one mole of amine per equivalent of the carboxylic composition. For the purpose of this invention, an equivalent of amine is that amount of amine corresponding to the total weight of amine divided by the total number of condensable nitrogens present having H—N<groups. Thus, octyl amine has an equivalent weight equal to its molecular weight; ethylenediamine has an equivalent weight equal to one-half its molecular weight, and aminoethylpiperazine, with 3 nitrogen atoms but only two having at least one H—N<group, has an equivalent weight equal to one-half of its molecular weight.

The Oil of Lubricating Viscosity

The lubricating compositions of this invention employ an oil of lubricating viscosity, including natural or synthetic lubricating oils and mixtures thereof. Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins and mixtures thereof, alkylbenzenes, polyphenyl, (e.g., biphenyls, terphenyls, alkylated polyphenyls), alkylated diphenyl ethers and alkylated diphenyl sulfides and the derivatives, analogs and homologues thereof. Alkylene oxide polymers and interpolymers and derivatives thereof where their terminal hydroxyl groups have been modified by esterification, etherification, etc., constitute another useful class of known synthetic lubricating oils. Another suitable class of synthetic lubricating oils comprises the esters of di- and poly-carboxylic acids and those made from $C_5$ to $C_{20}$ monocarboxylic acids and polyols and polyolethers. Other synthetic lubricating oils include liquid esters of phosphorus-containing acids, polymeric tetrahydrofurans and the like, silicon-based oils such as the polyalkyl-, polyaryl-, polyalkoxy-, or polyaryloxy-siloxane oils and silicate oils. Synthetic oils also include those produced by a gas-to-liquid or Fischer-Tropsch process.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Oils of lubricating viscosity can also be defined as specified in the American Petroleum Institute (API) Base Oil Interchangeability Guidelines. The five base oil groups are as follows:

| Base Oil Category | Sulfur (%) | | Saturates (%) | Viscosity Index |
|---|---|---|---|---|
| Group I | >0.03 | and/or | <90 | 80-120 |
| Group II | <0.03 | and | >90 | 80-120 |
| Group III | <0.03 | and | >90 | >120 |
| Group IV | All polyalphaolefins (PAOs) | | | |
| Group V | All others not included in Groups I, II, III, or IV | | | |

Groups I, II, and III are mineral oil base stocks. Group III base oils are also sometimes considered to be synthetic base oils.

Other Additives

The lubricating oil compositions of this invention may contain other components. The use of such additives is optional and the presence thereof in the compositions of this invention will depend on the particular use and level of performance required. Thus the other additive may be included or excluded. The compositions may comprise a metal salt, frequently a zinc salt of a dithiophosphoric acid. Zinc salts of dithiophosphoric acids are often referred to as zinc dithiophosphates or zinc O,O'-dihydrocarbyl dithiophosphates and are sometimes referred to by the abbreviations ZDP, ZDDP, or ZDTP. One or more zinc salts of dithiophosphoric acids may be present in a minor amount to provide additional extreme pressure, anti-wear and anti-oxidancy performance. Other metal salts of dithiophosphoric acids, such as copper, antimony, etc. salts are known and may be included in the lubricating oil compositions of this invention.

Other additives that may optionally be used in the lubricating oils of this invention include detergents, dispersants, viscosity improvers, oxidation inhibiting agents (antioxidants), pour point depressing agents, extreme pressure agents, friction modifiers, anti-wear agents, color stabilizers and anti-foam agents. The above-mentioned dispersants and viscosity improvers may be used in addition to the compositions of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers (that is, vinylarene-conjugated polyene copolymers and hydrogenated copolymers of this type, such as hydrogenated styrene-butadiene copolymers), and polyolefins. Multifunctional viscosity improvers, other than those of the present invention, which also have dispersant and/or antioxidancy properties are known and may optionally be used in addition to the products of this invention.

Detergents are typically overbased materials. Overbased materials, otherwise referred to as overbased or superbased salts, are generally homogeneous Newtonian systems characterized by a metal content in excess of that which would be present for neutralization according to the stoichiometry of the metal and the particular acidic organic compound reacted with the metal. The overbased materials are prepared by reacting an acidic material (typically an inorganic acid or lower carboxylic acid, preferably carbon dioxide) with a mixture comprising an acidic organic compound, a reaction medium comprising at least one inert, organic solvent (mineral oil, naphtha, toluene, xylene, etc.) for said acidic organic material, a stoichiometric excess of a metal base, and a promoter such as a phenol or alcohol. The acidic organic material will normally have a sufficient number of carbon atoms to provide a degree of solubility in oil. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5.

Such overbased materials are well known to those skilled in the art. Patents describing techniques for making basic salts of sulfonic acids, carboxylic acids, phenols, phosphonic acids, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

Dispersants are well known in the field of lubricants and include primarily what is known as ashless-type dispersants. Ashless type dispersants are characterized by a polar group attached to a relatively high molecular weight hydrocarbon chain. Typical ashless dispersants include N-substituted long chain alkenyl succinimides, having a variety of chemical structures including typically

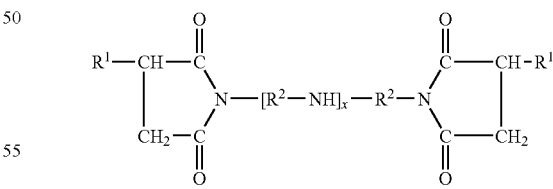

where each $R^1$ is independently an alkyl group (which may bear more than one succinimide group), frequently a polyisobutyl group with a molecular weight of 500-5000 (and the corresponding dispersant is thus a polyisobutene succinimide), and $R^2$ are alkylene groups, commonly ethylene ($C_2H_4$) groups. Such molecules are commonly derived from reaction of an alkenyl acylating agent with a polyamine, and a wide variety of linkages between the two moieties is possible beside the simple imide structure shown above, including a variety of amides and quaternary ammonium salts. Succinimide dispersants are more fully described in U.S. Pat. Nos. 4,234,435 and 3,172,892. Particularly useful succinimide dispersants are those having a N:CO ratio of greater than about 1, that is, with overall excess nitrogen functionality derived from the polyamine, compared with the carbonyl functionality derived from the succinic acid groups. Such materials may also be described as high nitrogen dispersants, containing at least 1.6% or at least 2% nitrogen in the dispersant (on an active chemical, oil-free basis) and having a relatively high total base number (TBN) of at least 30, 40, or even 50 (mg equivalent KOH per gram of sample, active chemical basis). Desirable materials are also relatively high molecular weight dispersants, having, for instance alkyl or hydrocarbyl (polymer) groups with $\overline{M}_n$ of greater than 1300.

Another class of ashless dispersant is high molecular weight esters. These materials are similar to the above-described succinimides except that they may be seen as having been prepared by reaction of a hydrocarbyl acylating agent and a polyhydric aliphatic alcohol such as glycerol, pentaerythritol, or sorbitol. Such materials are described in more detail in U.S. Pat. No. 3,381,022.

Another class of ashless dispersant is Mannich bases. These are materials which are formed by the condensation of a higher molecular weight, alkyl substituted phenol, an alkylene polyamine, and an aldehyde such as formaldehyde. Such materials may have the general structure

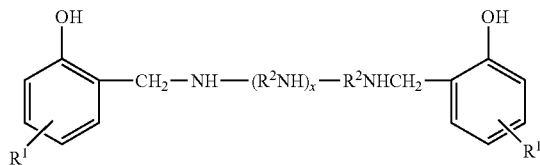

(including a variety of isomers and the like) and are described in more detail in U.S. Pat. No. 3,634,515.

Other dispersants include polymeric dispersant additives, which are generally hydrocarbon-based polymers which contain polar functionality to impart dispersancy characteristics to the polymer.

Dispersants can also be post-treated by reaction with any of a variety of agents. Among these are urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. References detailing such treatment are listed in U.S. Pat. No. 4,654,403.

The above-illustrated additives may each be present in lubricating compositions at a concentration of as little as 0.001% by weight, usually 0.01% to 20% by weight. In most instances, they each contribute 0.1% to 10% by weight, more often up to 5% by weight.

Additive Concentrates

The various additives described herein can be added directly to the lubricant. Preferably, however, they are diluted with a concentrate-forming amount of a substantially inert, normally liquid organic diluent such as mineral oil or a synthetic oil such as a polyalphaolefin to form an additive concentrate. These concentrates usually comprise 0.1 to 80% by weight of the compositions of this invention and may contain, in addition, one or more other additives known in the art or described hereinabove. Concentrations such as 15%, 20%, 30% or 50% of the additives or higher may be employed. By a "concentrate forming amount" is generally mean an amount of oil or other solvent less than the amount present in a fully formulated lubricant, e.g., less than 85% or 80% or 70% or 60%. Additive concentrates can be prepared by mixing together the desired components, often at elevated temperatures, usually up to 150° C. or 130° C. or 115° C.

Lubricating Oil Compositions

The instant invention also relates to lubricating oil compositions containing the carboxylic compositions of the invention. The amount of polymer contained in a fully formulated lubricant is typically 0.1 to 10% by weight, alternatively 0.5 to 6% or 1 to 3% by weight. As noted hereinabove, the compositions of this invention may be blended directly into an oil or lubricating viscosity or, more often, are incorporated into an additive concentrate containing one or more other additives which in turn is blended into the oil.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

Example 1

Isobutylene, isoprene, hexane, and AlCl$_3$ are charged to a 1 L continuous reactor. Solid AlCl$_3$ is added to promote polymerization of the monomers. The reaction mixture is maintained at –30° C. by external cooling. Over seven hours, 7056 g isobutylene, 858 g isoprene, 11,780 mL hexanes, and 17.3 g AlCl$_3$ are charged to the reaction vessel.

Product leaving the reactor is quenched by dropping into a mixture of hexanes, methanol and water. The organic layer is washed with distilled water, dried with magnesium sulfate, filtered, concentrated in vacuo and stripped at 205° C. at 133 Pa (1 mm Hg). The yield of copolymer is 2450 g. $\overline{M}_n$ (GPC vs. polyisobutylene standards) is 6900. By $^1$H NMR, 1 isoprene-derived monomer unit is present in 1000 molecular weight units of the polymer.

Example 2

A copolymer is prepared analogously to the polymer in example 1. Over ten hours, 10,080 g isobutylene, 915 g isoprene, 16,420 mL hexanes, and 13 g AlCl$_3$ are charged to the reaction vessel. The yield of copolymer is 3429 g. $\overline{M}_n$ (GPC vs. polyisobutylene standards) is 8200. By $^1$H NMR, 1 isoprene-derived monomer unit is present in 1300 molecular weight units of the polymer.

Examples 3-6

Four copolymers are prepared analogously using different catalysts and different temperatures.

|  | Example 3 | Example 4 | Example 5 | Example 6 |
| --- | --- | --- | --- | --- |
| Isobutylene, g | 7056 | 3024 | 7056 | 8064 |
| Isoprene, g | 643 | 274 | 643 | 733 |
| Hexane, g | 7700 | 3300 | 7700 | 9600 |
| Catalyst, g | 7 | 3 | 7 | 10 |
| Identity of catalyst | EtAlCl$_2$ | EtAlCl$_2$ | AlCl$_3$ | AlCl$_3$ |
| Reaction temp., °C. | −30 | −50 | −50 | −32 |
| Reaction time, hr | 7 | 3 | 7 | 8 |
| Yield of copolymer, g | 1500 | 587 | 1500 | 2742 |
| $\overline{M}_n$ of copolymer | 11,400 | 13,800 | 14,000 | 12,750 |
| Molecular Wt. per isoprene-derived monomer unit | 1500 | 1153 | 1074 | 1784 |

Example 7

The copolymer from example 1 (2450 g) and maleic anhydride (88 g) are heated at 203° C. for 24 hours with stirring under a blanket of N$_2$ and are blown with N$_2$ for 30 minutes at 14 L/hr (0.5 SCFH). The resulting hydrocarbyl-substituted acylating agent has a Total Acid Number (TAN) of 38 and 0.7 wt. % unreacted maleic anhydride.

Examples 8-10

Three hydrocarbyl-substituted acylating agents are prepared according to the procedure of Example 7 using copolymer of Example 2.

|  | Example 8 | Example 9 | Example 10 |
| --- | --- | --- | --- |
| Copolymer, g | 725 | 2048 | 650 |
| Maleic anhydride, g | 16 | 57 | 29 |
| TAN | 24 | 29 | 40 |
| Unreacted maleic anhydride, wt % | 0.07 | 0.08 | 0.16 |

Examples 11-12

Two hydrocarbyl-substituted acylating agents are prepared according to the procedure of Example 7 using the copolymers of Examples 3-4.

| Identity of copolymer | Example 11 Example 3 | Example 12 Example 4 |
| --- | --- | --- |
| Copolymer, g | 1600 | 586 |
| Maleic anhydride, g | 63 | 25 |
| TAN | 39 | 40 |
| TAN after oil dilution (50%) | 21 | 22 |
| Unreacted maleic anhydride, wt % | 0.19 | 0.2 |

Example 13

The copolymer from example 6 (403 g) and maleic anhydride (22 g) are heated to 160° C. with stirring under a blanket of N$_2$ 14 L/hr (0.5 SCFH). T-butyl peroxide (4 g) is charged to a dropping funnel and added drop-wise over 2.5 hr. The preparation is stirred for an additional 30 min at 160° C., and the sample is purged with N$_2$ 57 L/hr (2.0 SCFH) at 190° C. The resulting hydrocarbyl-substituted acylating agent has a Total Acid Number (TAN) of 46 and 0.2 wt. % unreacted maleic anhydride.

Example 14

A dispersant viscosity modifier is prepared by diluting 175 g of the hydrocarbyl-substituted acylating agent of Example 7 with 393 g diluent oil. Then 11 g 4-aminodiphenylamine is added at 110° C. over 30 minutes followed by heating at 160° C. for 4 hours. The product is obtained by filtration through a pad of diatomaceous earth. Yield is 548 g. Percent nitrogen is 0.29. Kinematic viscosity at 100° C.=98 (KV100, ASTM D445_100).

Examples 15-17

Three dispersant viscosity modifiers are prepared by the method of Example 14 using the hydrocarbyl-substituted acylating agents of Examples 8-10.

| Acylating agent: source | Example 15 Example 8 | Example 16 Example 9 | Example 17 Example 10 |
| --- | --- | --- | --- |
| amount, g | 680 | 990 | 618 |
| Oil, g | 1497 | 2195 | 1390 |
| Aminodiphenylamine, g | 27 | 48 | 40 |
| Yield | 2105 | 3074 | 1963 |
| % nitrogen | 0.17 | 0.19 | 0.33 |
| KV 100 | 94 | 96 | 124 |

Example 18

A dispersant viscosity modifier is prepared by diluting 1026 g of acylating agent of Example 9 with 2241 g of diluent oil. To this mixture at 50° C. is added 3 g of ethylenediamine dropwise over the course of two hours. The resulting mixture is warmed to 110° C. and 30 g 4-aminodiphenylamine is added portion-wise over ten minutes. The resulting mixture is stirred at 110° C. for one hour and then at 160° C. for nine hours. The product is filtered using diatomaceous earth. Yield is 3119 g. Percent nitrogen is 0.22. KV 100 is 177.

Example 19

A dispersant viscosity modifier is prepared by diluting 374 g of the acylating agent from Example 13 with 852 g of diluent oil. To this mixture at 110° C. is added 28 g of 4-aminodiphenylamine over the course of 30 min. The resulting mixture is warmed to 160° C. and stirred for 5 hr. The product is filtered using diatomaceous earth. Yield is 1205 g. Percent nitrogen is 0.29. KV 100 is 159.

A soot screen test is performed on several of the experimental samples prepared above. In this test, the candidate chemistry is added to an oil sample from the end of a test drain from a Mack™ T-11 engine. The sample is subjected to oscillation and the ability of the candidate to reduce the buildup of associations between molecules of soot is measured as a modulus, by a method described in SAE Paper 2001-01-1967, "Understanding Soot Mediated Oil Thickening: Rotational Rheology Techniques to Determine Viscosity and Soot Structure in Peugot XUD-11 BTE Drain Oils," M. Parry, H. George, and J. Edgar, presented at International Spring Fuels & Lubricants Meeting & Exhibition, Orlando, Fla., May 7-9, 2001. The calculated parameter is referred to as G'. The G' of the sample treated with the experimental chemistry is compared to the G' of the drain oil without the additive, the latter of which is defined as 1.00. Values of G' less than 1.00 indicate increasing effectiveness at soot dispersion.

G' Table

| Dispersant ID | Ex. 20 Ex. 14 | Ex. 21 Ex. 15 | Ex. 22 Ex. 16 | Ex. 23 Ex. 17 | Ex. 24 Ex. 18 | Ex. 25 Ex. 19 |
|---|---|---|---|---|---|---|
| 1% disp. | 0.33 | 0.55 | 0.47 | 0.16 | 0.25 | 0.16 |
| 2% disp. | 0.17 | 0.34 | 0.31 | 0.09 | 0.11 | 0.04 |

Examples 26-28

Three lubricant formulations are prepared and are subjected to the Mack™ T-11 test. In this test a sample of lubricant is run in a Mack™ T-11 for up to 252 hours. Over time, as soot is accumulated in the oil, samples are withdrawn and their kinematic viscosity is measured at 100° C. Results are reported as viscosity increase in mm²/s (cSt).

Example 26 (reference) is a baseline contains oil and a commercial composition including an olefin copolymer viscosity modifier, detergent(s), overbased calcium detergent(s), phenolic antioxidant(s), a corrosion inhibitor, and other conventional components. Example 27 (reference) is substantially the same formulation but contains 2.6% of a succinimide dispersant with a polyisobutylene/isoprene substituent (not corrected for diluent oil; 1.17% active chemical in the lubricant). Example 28 is substantially the same formulation but containing 3.1% of the dispersant viscosity modifier of the present invention, (as in Example 27, not corrected; providing 1.0% active chemical in the lubricant), and the amount of conventional viscosity modifier reduced by a comparable amount.

The viscosity increase for each of the samples, as a function of time and soot buildup, is shown in the following table:

| | Example 26 (ref) Baseline | | Example 27 (ref) Baseline + IOB/IP dispersant | | Example 28 Baseline + IOB/IP dispersant/VM | |
|---|---|---|---|---|---|---|
| time, hr. | wt % Soot | Viscosity increase, mm²/s (cSt) | wt % Soot | Viscosity increase, mm²/s (cSt) | wt % Soot | Viscosity increase, mm²/s (cSt) |
| 0 | 0.16 | 0.00 | 0.21 | 0.00 | 0.15 | 1.92 |
| 12 | 0.44 | 0.00 | 0.61 | 0.00 | 0.59 | 1.51 |
| 24 | 0.67 | 0.00 | 0.80 | 0.00 | 0.80 | 1.41 |
| 36 | 0.98 | 0.00 | 1.09 | 0.00 | 1.02 | 1.42 |
| 48 | 1.35 | 0.02 | 1.53 | 0.08 | 1.32 | 1.40 |
| 60 | 1.66 | 0.06 | 1.79 | 0.11 | 1.59 | 1.50 |
| 72 | 1.95 | 0.30 | 2.11 | 0.15 | 1.92 | 1.60 |
| 84 | 2.36 | 0.45 | 2.44 | 0.37 | 2.26 | 1.84 |
| 96 | 2.75 | 0.72 | 2.79 | 0.55 | 2.55 | 2.02 |
| 108 | 3.10 | 1.12 | 3.06 | 0.77 | 2.89 | 2.27 |
| 120 | 3.47 | 1.64 | 3.46 | 1.11 | 3.37 | 2.72 |
| 132 | 3.83 | 2.20 | 3.80 | 1.61 | 3.70 | 2.99 |
| 144 | 4.17 | 3.13 | 4.17 | 2.15 | 3.99 | 3.45 |
| 156 | 4.52 | 4.72 | 4.47 | 2.71 | 4.27 | 4.17 |
| 168 | 4.84 | 7.82 | 4.78 | 3.54 | 4.59 | 4.61 |
| 180 | 5.21 | 16.55 | 5.03 | 5.00 | 4.84 | 5.44 |
| 192 | 5.69 | 35.66 | 5.43 | 7.54 | 5.17 | 6.33 |
| 204 | 6.14 | 53.12 | 5.76 | 17.30 | 5.48 | 7.11 |
| 216 | 6.21 | 139.66 | 5.92 | 28.92 | 5.88 | 9.88 |
| 228 | 6.66 | | 6.26 | 43.35 | 6.28 | 14.24 |
| 240 | 7.09 | | 6.54 | 47.21 | 6.53 | 29.43 |
| 252 | 7.58 | | 6.96 | 71.46 | 6.84 | 50.29 |

The results in the table show that the baseline material exhibits a significant rise in viscosity beginning at about a 4% soot level (144 hours). The baseline+dispersant material of Example 27 exhibits a gradual increase and a significant upward break at around 5.5% soot level (192 hours). The inventive material of Example 28 also exhibits gradual increase and a significant upward break at around 6% soot level (216 hours). (The non-zero values for viscosity increase for Example 28 at low soot levels are considered to be of no significance and may be subtracted from the subsequent values in this table.) The results show that the materials of the present invention are effective at dispersing soot in this diesel engine test.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A composition comprising the reaction product of:
   (a) an isobutylene-diene copolymer having an $\overline{M_n}$ of about 1000 to about 150,000 and containing thereon an average of about 0.1 to 4 equivalents, per each 1000 units of $\overline{M_n}$ of the polymer, of carboxylic acid functionality or reactive equivalent thereof, derived from at least one α,β-unsaturated carboxylic compound; and
   (b) an amine component comprising 4-aminodiphenylamine.

2. The composition of claim 1 wherein the diene is selected from the group consisting of isoprene, piperylene, 1,3-butadiene, and limonene.

3. The composition of claim 1 wherein the diene comprises isoprene.

4. The composition of claim 1 wherein (a) the copolymer containing carboxylic acid functionality is prepared by reacting (i) an isobutylene-diene copolymer having on average about 1 to about 150 moles of reactive carbon-carbon double bonds per mole of copolymer and about 0.1 to about 2 moles of said double bonds per 1000 units of $\overline{M_n}$ of the copolymer, with (ii) an α,β-unsaturated carboxylic compound.

5. The composition of claim 1 wherein the α,β-unsaturated carboxylic compound comprises an acrylic compound, a methacrylic compound, a maleic compound, a fumaric compound, or an itaconic compound.

6. The composition of claim 1 wherein the α,β-unsaturated carboxylic compound comprises maleic anhydride.

7. The composition of claim 1 wherein the amine component further comprises an amine having at least two N—H groups capable of condensing with said carboxylic acid functionality.

8. The composition of claim 7 wherein the amine having at least two N—H groups comprises ethylenediamine, 2,4-diaminotoluene, or phenylenediamine.

9. The composition of claim 1 wherein the isobutylene-diene copolymer has an $\overline{M_n}$ of 3000 to about 150,000.

10. A lubricant composition comprising a major amount of an oil of lubricating viscosity and a minor amount of the composition of claim 1.

11. The lubricant composition of claim 10 further comprising at least one additive selected from the group consisting of detergents, dispersants, viscosity modifiers, pour point depressants, friction modifiers, antioxidants, and antiwear agents.

12. The lubricant composition prepared by admixing the components of claim 11.

13. The lubricant composition of claim 10 further comprising a polyisobutene succinimide dispersant having a N:CO ratio of greater than about 1.

14. The lubricant composition of claim 10 further comprising a hydrogenated copolymer of a vinylaromatic monomer with a conjugated polyene.

15. A process for lubricating an internal combustion engine, comprising supplying thereto the lubricant of claim 10.

16. A process for improving the viscosity index of a lubricating oil composition comprising incorporating into said composition a minor, viscosity-improving amount, of the composition of claim 1.

17. A process for reducing soot-induced viscosity increase in a lubricating oil composition comprising incorporating into said composition a minor, viscosity-improving amount, of the composition of claim 1.

18. A concentrate comprising the composition of claim 1 and a concentrate-forming amount of an oil of lubricating viscosity.

19. A process for preparing a carboxylic derivative composition, comprising:

(a) reacting
  (i) an isobutylene-diene copolymer having an $\overline{M_n}$ of about 1000 to about 150,000 and having on average about 0.1 to about 2 units of reactive carbon-carbon double bonds per each 1000 units of $\overline{M_n}$ of the polymer, with
  (ii) an $\alpha,\beta$-unsaturated carboxylic compound having carboxylic acid functionality or reactive equivalent thereof; and
(b) reacting the product of (a) with an amine component comprising 4-aminodiphenylamine.

20. The process of claim 19 wherein the $\alpha,\beta$-carboxylic compound is reacted with the isobutylene-diene polymer via a thermal reaction in the substantial absence of added chlorine.

21. The process of claim 19 wherein the $\alpha,\beta$-carboxylic compound is reacted with the isobutylene-diene polymer via a radical reaction.

22. The process of claim 19 wherein the amine component of (b) further comprises an amine having at least two N—H groups capable of condensing with said carboxylic acid functionality.

23. A composition comprising the reaction product of:
(a) an isobutylene-diene copolymer having an $\overline{M_n}$ of about 1000 to about 150,000 and containing thereon an average of about 0.1 to 4 equivalents, per each 1000 units of $\overline{M_n}$ of the polymer, of carboxylic acid functionality or reactive equivalent thereof, derived from at least one $\alpha,\beta$-unsaturated carboxylic compound; and
(b) an amine component comprising 3-nitroaniline.

\* \* \* \* \*